Aug. 27, 1940.   E. W. BECK ET AL   2,213,023
CATADIOPTRIC DEVICE AND METHOD OF MANUFACTURE THEREOF
Filed April 29, 1939
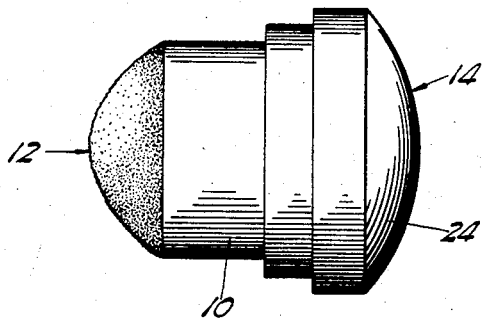
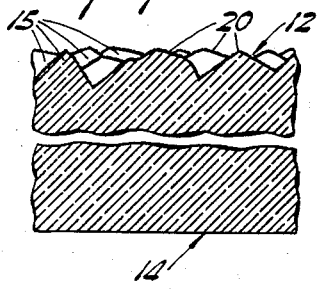   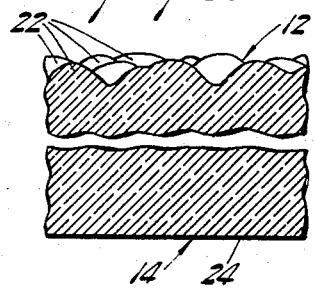
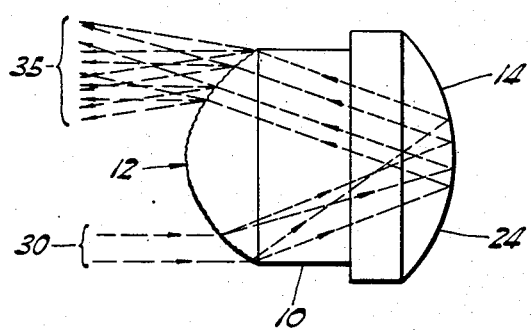
INVENTORS
EARL W. BECK AND
VICTOR WALKER
BY
Beau, Brooks, Buckley & Beau
ATTORNEYS Patented Aug. 27, 1940

2,213,023

UNITED STATES PATENT OFFICE 2,213,023

CATADIOPTRIC DEVICE AND METHOD OF MANUFACTURE THEREOF

Earl W. Beck, Eggertsville, N. Y., and Victor Walker, Fort Erie, Ontario, Canada, assignors, by mesne assignments, to AlnCin, Inc., a corporation of New York Application April 29, 1939, Serial No. 270,870

12 Claims. (Cl. 88—82)

This invention relates to light reflecting devices of catadioptric type which are sometimes known in the trade as "reflector buttons"; and to an improved method for producing the same. This application is a continuation in part of our application Serial No. 232,920 filed October 3, 1938.

Devices of the type specified are at present in widespread use in connection with the formation of advertising, highway marking and other roadside signs; and essentially comprise objective lenses in combination with reflection devices so arranged as to intercept light coming from various angles and to return it toward the source with the result that the device is caused to appear to be illuminated when viewed from a position nearby or substantially in line with the light source. Various means have been devised for providing such units of efficient light reflecting form, including means for optically correcting the units against spherical aberration and wasteful divergence of the reflected light beam. For example, it has previously been proposed to provide the refracting objective portions of such lenses generally of special aspheric contour, and locally of light diffusing surface form for controlled beam effects.

Previous methods of manufacturing such devices have involved, however, certain serious limitations and disadvantages. For example, the units are usually made by first employing a molding process wherein gobs of molten glass are pressed into the desired general shape of the device. Upon removal from the molds, however, the units are found to have films of low transparency substance at each of the lens faces resulting from contact with the heated metal of the mold. This film material must be removed by buffing or other polishing processes before any substantial degree of light transmitting ability is obtained. Also, in connection with rapid production methods, upon removal of the units from the molds it is found that their face portions are warped or otherwise untrue to the theoretical contour which the molds are designed to produce, due to unequal shrinkage of the glass upon cooling. Consequently, the products of such molding operations are optically incorrect for the purpose intended and are capable only of functioning in such manner as to produce haphazard and otherwise inefficient results.

Also, it is difficult to maintain the molds employed for such purposes in accurate form because of the intensive temperature changes that take place therein resulting in scaling of the mold surfaces. Consequently the mold surfaces are continually becoming disrupted and out of shape, and require constant redressing. This difficulty is particularly evident where the cheaper grades of glass are employed because of the relatively high temperatures which are required to reduce the inexpensive grades of glass to molten state; and in some cases it is attempted to avoid the disadvantages of rapid mold deterioration by employing relatively expensive grades of glass which may be rendered soft and plastic at lower temperatures. This latter scheme, however, greatly increases the cost of manufacture and therefore involves another serious disadvantage; and in any event mold deterioration takes place ultimately and this results in the production of articles of non-uniform quality. Consequently, where optical efficiency is required the products of the molding operations have, in accord with prior methods, been subsequently treated by optical-type grinding and polishing methods, and therefore it is obvious that these previous methods of manufacture are inherently unsuited to fully automatic production operations of the types that are capable of effecting maximum manufacturing economies and inherently provide specular type surface reflection effects in the finished lens.

It is an object of the present invention to provide an improved form of light controlling and diffusing objective surface for the purpose specified, and an improved method for producing the same. The method of the invention also provides an improvement in connection with the preparation of the rear surface portion of the lens unit preparatory to application of a reflective device thereon. The article of the invention functions in greatly improved manner, and appears to be fully and evenly illuminated from every useful angle. Also, the light reflective efficiency of the unit is of increased order, and the method of manufacture of the invention is fully adaptable to fully automatic machine production systems whereby maximum manufacturing economies may be effected without detriment to the quality of the finished products. Other objects and advantages of the invention will appear from the specification herein.

In the drawing:

Fig. 1 is an elevation of an autocollimating reflex device constructed in accord with the invention;

Fig. 2 is a fragmentary sectional view on a greatly enlarged scale through the objective face portion and the reflective portion of the unit of Fig. 1 as they appear at an intermediate stage of the manufacture thereof;

Fig. 3 is a view corresponding to Fig. 2 at the end of the manufacturing process; and Fig. 4 is a view corresponding to Fig. 1 diagrammatically illustrating the functioning of the device.

In practicing the invention a supply of glass is initially shaped generally into approximate form by means of any suitable process such as molding, or the like; provision being made that any deviations from the prescribed ultimate contour will occur in the form of excess stock which may be removed subsequent to solidification of the glass material. The objective surface portion of the lens is next dressed accurately into the prescribed general contour by means of grinding or any other suitable abrasion method such as is employed in the lens grinding arts. This contouring operation simultaneously produces the dressed lens surface of optically correct general curvature and locally of irregularly serrated form, the resulting surface structure thereof being in the form of closely packed irregular pyramidal cusps, of the character of ordinary ground glass. As a secondary result of this contouring operation the final surface portions of the cusps become coated with waste product materials of the abrasion action which greatly reduce the light transmitting ability thereof.

The lens is next immersed in a mixture of hydrofluoric and sulphuric acids and water for a sufficient length of time to allow the acid to completely remove the light screening waste products of the grinding operation from the cusp walls and the crevices therebetween and to simultaneously clear the rear lens surface of the dirt or scale film which usually remains thereon as a result of contact with the mold under high temperature conditions. A reflection device is then applied at the rear face of the lens to complete the catadioptric unit.

The invention is illustrated herein by way of example in connection with the manufacture of a catadioptric unit of the "reflector button" type comprising essentially a solid glass cylindrical intermediate body portion 10; an objective face portion 12; and a reflecting rear face 14. The base of this lens unit will have been initially formed by pressing or casting heated glass in a mold which is shaped approximately to complement the contour of the portion 10 and one of the end faces, the pressing die being formed to complement the other of the end faces. Preferably the mold and die parts are so dimensioned and arranged as to provide a slight excess of glass stock at the face 12 of the lens. Hence, upon cooling of the glass material the shrinkage therein will not retract any portion of the face 12 inside of the prescribed contour thereof.

The next step of the manufacturing process involves grinding of the face 12 accurately to prescribed general contour and simultaneously providing the face 12 locally of irregularly serrated form, as illustrated in Fig. 2. It will be understood that the profile of the face 12 may be of any desired type of curvature, or may be of compound curvature form, so that the objective portion of the lens will have the optical characteristics of either spherical or aspherical or compound curved lens forms, as any given case of use may require. Similarly, the rear face 14 of the lens may be of either spherical, aspherical or other form, depending upon the design of the unit and the purpose for which it is intended. It has been found, however, that a most useful and practical form of reflecting button involves a design in which the rear surface 14 is of spherical form and the front surface 12 is of aspherical form for correction of aberration effects in the lens and auto-collimation of the light rays. In such case, as illustrated in Fig. 1, it will be noted that all portions of the rear face 14 are substantially equidistant from the center of the unit mass, as distinguished from the relative positions of different portions of the aspherically contoured face 12 which are at various distances from the center of the unit mass. Consequently, upon cooling of the glass material of the unit, the spherical surface 14 shows substantially no tendency to deviate from the prescribed contour, whereas the surface 12 tends to shrink unevenly and to become warped out of its prescribed contour form. Hence, whereas the rear surface 14 requires no subsequent dressing operation to provide it of prescribed contour, a subsequent dressing of the front surface 12 is necessary to bring it accurately into prescribed form. For this purpose a grinding pad shaped complementary to the prescribed contour may be employed in combination with a relatively coarse loose abrasive such as carborundum or the like, the pad being rotated relative to the surface 12 about the optical axis of the lens to produce the form of surface illustrated in Fig. 2. This grinding operation serrates the surface of the glass material into a multitude of minute pyramidal cusps 15 and coincidentally deposits substantial quantities of non-transparent "sludge" or waste products of the grinding operation upon the finally exposed glass surface structure, as illustrated at 20.

The lens is next immersed in a bath comprising essentially a mixture of hydrofluoric and sulphuric acids in water for a period of time sufficient to allow the acid to remove the light screening substances 20 from the serrated surfaces of the structure illustrated in Fig. 2. The acid of the bath attacks this waste material relatively rapidly and removes it from the unaltered glass base material therebeneath, without substantial modification of the forms of the cusps, although a slight rounding of the sharper corner portions of the structure may occur; thus leaving a surface which follows generally the prescribed form of the lens contour but deviates locally therefrom in the form of irregularly spaced minute dome-like cusps 22. (Fig. 3.) Thus, the light ray receiving and emissive face 12 of the lens is of such form generally as to provide the desired optical performance and to control divergence of the reflected light within the useful field for which the lens is designed. The minute dome-like prisms of the surface structure function, however, as minute diffusion elements and provide integration of the chromatically separated light rays (Fig. 4) and uniform intensity of illumination throughout the reflected beam section without introduction of specular reflection effects.

As explained hereinabove, the rear surface 14 usually requires no secondary contouring upon removal from the mold to provide it of prescribed sectional profile because there is no tendency for it to warp during the glass cooling process. Therefore, no grinding operation is required in connection with the surface 14, but it is invariably coated with a dirty film substance upon removal from the mold as a result of contact of the heated glass with the metal of the mold. The immersion of the lens in the hydrofluoric and sulphuric acid bath as described hereinabove, however, removes this film from the surface 14 and leaves the surface perfectly clear and in such condition as to be adapted to transmit light therethrough both toward and away from a reflective device positioned therebeyond, in an improved manner.

In connection with conventional methods of reflector button manufacture, the need for removal of the mold residue film from the lens surfaces preparatory to the mounting of reflective devices thereon has been recognized, and to this end the surfaces are usually polished by means of a buffing process, or the like. It is well known, however, that the use of highly polished surfaces inherently involves substantial losses of light transmitting efficiency because of specular effects and losses due to direct reflection of light at the surfaces of entry. Therefore, in the case of conventional reflector buttons wherein the surfaces corresponding to surface 14 of Fig. 1 have been polished in accord with conventional methods preparatory to the application of a reflective device such as a silvered coating thereon, or the like, substantial losses in efficiency are experienced. As distinguished from this, the method of the present invention provides a perfectly cleared but unpolished surface at 14 which possesses the ultimate light transmitting ability, and avoids the introduction of front surface light reflective losses into the system.

Thus, the acid bath step of the manufacturing operation of the invention prepares the surface 14 for transmission of light to and from the associated reflection device in an improved manner, and simultaneously produces at the objective face 12 of the lens a novel light ray diffusing and integrating form of surface structure which is free from specular reflection characteristics; the general contour of the face 12 having been previously contoured accurately to prescribed profile form for the desired type of optical performance as an incident to the preparation of the glass base material of the unit for the acid bath treatment step of the process.

Referring again more specifically to the form of the invention illustrated in the drawing, the rear surface 14 is silvered or coated with suitable light reflective material 24 subsequent to the acid bath step of the manufacturing operation; but it is to be understood that it is contemplated that the invention may be usefully employed in connection with any other desired type of deflector mounting arrangement. For example, in some types of construction the reflective device is provided in the form of a dish-shaped metallic mirror, or the like, which is provided as an independent element and mounted in either spaced or contiguous relation adjacent the rear face 14 of the lens. In any case, it will be understood that the novel method of clearing the face 14 of mold film material will provide the light transmitting efficiency and advantages herein above described.

Particular attention is called to the fact that the invention may be applied with equal facility to the construction of catadioptric devices having any desired types of objective and reflective surface contours, and that the character of the light diffusing and integrating results to be obtained may be regulated by varying the coarseness of the abrasive used in connection with the steps of serrating the optical faces of the lenses. Also, in some cases it may be desirable to provide the rear surface 14 of light diffusing form of the type described hereinabove in connection with the objective face 12; and it is contemplated that the cusp producing steps of the invention hereinabove described may be applied to either the front face 12 or the rear face 14, or to both, depending upon the character of the results to be obtained. If a particularly fine degree of diffusion is required, it will be found advantageous to provide the cusp-type surface structure at both faces of the lens, and whenever the rear face 14 is so formed it will be found that the coating substance 24 will be enabled to adhere to the surface 14 in an improved manner due to the interlocking type of connection existing therebetween.

Fig. 4 illustrates diagrammatically the functioning of a reflector button device of the invention of a form wherein the rear face 14 is furnished with a reflective coating 24. The oncoming light rays 30 are refracted at the objective face 12 and chromatically dispersed as illustrated; the dispersed ray elements being separately reflected at 24 and returned to the objective face 12 through which they are projected generally in directions substantially parallel to the direction of the original beam 30. The emergent ray elements are locally refracted, however, at the face 12 because of the structure thereof as explained hereinabove, and an emergent beam 35 of uniformly diffused and chromatically integrated light is thereby produced. The surface structure of the face 12 introduces a controlled amount of minute diffusion of the emergent ray elements which acts to recombine and mix the elements which were previously separated by the chromatic aberration of the lens. Therefore, chromatic effects are eliminated; and coincidentally, the sharpness of the focus is impaired and any desired degree of controlled spread of the emergent beam centered on the axis of the lens is obtainable in combination with any desired modification and control of the beams directed obliquely thereto.

A particular advantage of the method of the invention resides in the fact that it is adaptable to fully automatic production methods wherein the stock feeding and pressing operations of the molding process may be carried on with great speed and without adverse effect upon the ultimate quality and optical efficiency of the finished products. At the same time, the method of the invention involves considerably less labor and/or other expensive manufacturing operations as compared to previous methods of manufacturing like articles because of the fact that it eliminates the need of conventional grinding and polishing operations which are at best tedious and expensive and uncertain with respect to the uniformity and quality of the finished products.

Although only one form of the invention has been shown and described in detail, it will be apparent to those skilled in the art that the invention is not so limited but that various changes may be made therein without departing from the spirit of the invention or from the scope of the appended claims.

We claim:
1. The method of manufacturing a catadioptric device comprising essentially the steps of molding a lens, grinding the rear optical face portion of said lens accurately to the prescribed general contour thereof by means of a loose abrasive adapted to leave the surface structure thereof serrated in the form of series of minute angular cusps, immersing said lens in a mixture of hydrofluoric and sulphuric acids and water to remove light screening substances from both of the optical face portions thereof, and coating the rear optical face of said lens with a reflective substance.

2. The method of manufacturing a catadioptric device comprising essentially the steps of shaping a glass stock piece into lens form, grinding at least one of the optical face portions of said lens accurately to the prescribed general contour thereof by means of a coarse loose abrasive adapted to provide thereon a minutely serrated surface structure comprising closely packed angular cusps, immersing said lens in a bath of hydrofluoric and sulphuric acids and water for a period of time sufficient to clear both of the optical surface portions thereof of light screening substances and to reduce said cusps to dome-shaped form, and mounting a reflection device adjacent the rear optical face of said lens.

3. The method of manufacturing a catadioptric device comprising essentially the steps of shaping a glass stock piece into the form of a lens, grinding at least one of the optical face portions of said lens accurately to the prescribed general contour thereof by means of a loose abrasive adapted to provide thereon a serrated surface structure comprising closely packed angular cusps, treating said serrated surface structure of said lens in a bath of hydrofluoric and sulphuric acids and water, the duration of said acid and water bath treating and the relative proportions of the ingredients of said bath being so regulated as to provide substantially complete removal from said serrated surface structure of light screening substances resulting from said grinding without elimination of said cusps, and mounting a reflection device adjacent the rear optical face of said lens.

4. As a new article of manufacture, a catadioptric device substantially identical with that obtained by the method of claim 1.

5. As a new article of manufacture, a catadioptric device substantally identical with that obtained by the method of claim 2.

6. As a new article of manufacture, a catadioptric device substantially identical with that obtained by the method of claim 3.

7. The method of manufacturing a catadioptric device comprising essentially the steps of shaping a glass stock piece into the form of a lens, roughening at least one of the optical face portions of said lens, treating the roughened face portion of said lens in a bath of hydrofluoric and sulphuric acids and water, the duration of said acid and water bath treating and the relative proportions of the ingredients of said bath being so regulated as to provide substantially complete removal from said roughened face portion of light screening substances resulting from the process of providing said roughening without elimination of said roughening, and mounting a reflection device adjacent the rear optical face of said lens.

8. As a new article of manufacture, a catadioptric device substantially identical with that obtained by the method of claim 7.

9. The method of manufacturing a catadioptric device comprising essentially the steps of shaping a glass stock piece into the form of a lens, abrading at least one of the optical face portions of said lens accurately to the prescribed general contour thereof by means of an abrasive adapted to provide thereon a serrated surface structure comprising closely packed angular cusps, treating said serrated surface structure of said lens in a bath of hydrofluoric acids and water, the duration of said acid and water bath treating and the relative proportions of the ingredients of said bath being so regulated as to provide substantially complete removal from said serrated surface structure of light screening substances resulting from said abrading without elimination of said cusps, and mounting a reflection device adjacent the rear optical face of said lens.

10. As a new article of manufacture, a catadioptric device substantially identical with that obtained by the method of claim 9.

11. The method of manufacturing a catadioptric device comprising essentially the steps of shaping a glass stock piece to the desired general contour of a lens and providing on at least one of the optical face portions thereof light diffusing formations, treating said lens in the region of said light diffusing formations in a bath of hydrofluoric and sulphuric acids and water, the duration of said acid and water bath treating and the relative proportions of the ingredients of said bath being so regulated as to provide substantially complete removal from the treated lens portion of light screening substances resulting from the process of providing said light diffusing formations but without elimination of said formations, and mounting a reflection device adjacent the rear optical face of said lens.

12. As a new article of manufacture, a catadioptric device substantially identical with that obtained by the method of claim 11.

EARL W. BECK.
VICTOR WALKER.

CERTIFICATE OF CORRECTION.

Patent No. 2,213,023.                                                August 27, 1940.

EARL W. BECK, ET AL.

It is hereby certified that error appears in the printed specification of the above numbered patent requiring correction as follows: Page 3, first column, line 54, for the word "deflector" read --reflector--; and second column, line 56, before "uncertain" insert --productive of specular reflection effects and--; page 4, second column, line 20, claim 9, after "hydrofluoric" insert --and sulphuric--; and that the said Letters Patent should be read with this correction therein that the same may conform to the record of the case in the Patent Office.

Signed and sealed this 24th day of September, A. D. 1940.

Henry Van Arsdale, (Seal)                                                          Acting Commissioner of Patents.